(12) United States Patent
McCann et al.

(10) Patent No.: US 9,080,386 B2
(45) Date of Patent: Jul. 14, 2015

(54) MAGNETIC GEAR FOR USE WITH WELLBORE INSTRUMENTS

(75) Inventors: Richard McCann, Aberdeen (GB); Kenneth Smith, Aberdeen (GB); Jeff Birchall, Sheffield (GB); Jamie Cochran, Kintore (GB); Michael J Rushby, Aberdeen (GB)

(73) Assignee: Magnomatics, Limited, Sheffield (GB)

( * ) Notice: Subject to any disclaimer, the term of this patent is extended or adjusted under 35 U.S.C. 154(b) by 319 days.

(21) Appl. No.: 13/608,113

(22) Filed: Sep. 10, 2012

(65) Prior Publication Data

US 2014/0069628 A1    Mar. 13, 2014

(51) Int. Cl.
| | |
|---|---|
| *E21B 1/22* | (2006.01) |
| *E21B 4/00* | (2006.01) |
| *E21B 4/04* | (2006.01) |
| *E21B 43/12* | (2006.01) |
| *H02K 49/10* | (2006.01) |
| *H02K 1/18* | (2006.01) |
| *H02K 1/28* | (2006.01) |

(52) U.S. Cl.
CPC . *E21B 4/006* (2013.01); *E21B 4/04* (2013.01); *E21B 43/128* (2013.01); *H02K 49/102* (2013.01); *H02K 1/185* (2013.01); *H02K 1/28* (2013.01); *H02K 2207/03* (2013.01)

(58) Field of Classification Search
USPC ............. 166/66.4, 66.5, 242.6; 175/104, 406; 417/420
See application file for complete search history.

(56) References Cited

U.S. PATENT DOCUMENTS

| | | | | |
|---|---|---|---|---|
| 4,729,160 | A | * | 3/1988 | Brown ............................ 29/598 |
| 4,771,528 | A | * | 9/1988 | Stromberg ....................... 29/259 |
| 7,549,467 | B2 | | 6/2009 | McDonald et al. |

* cited by examiner

*Primary Examiner* — Cathleen Hutchins
(74) *Attorney, Agent, or Firm* — Richard A. Fagin

(57) ABSTRACT

A wellbore rotating instrument system includes a source of rotational energy for transmission thereof to within a wellbore. At least one magnetic gear assembly is coupled at its input to an output of the source. A rotating load is coupled at its input to a rotational output of the magnetic gear assembly. The at least one magnetic gear assembly comprises a housing, a stator disposed in the housing proximate an inner wall thereof, a second shaft rotatably supported on bearings disposed at longitudinally spaced apart locations inside the housing and a first shaft rotatably supported inside the output shaft. The stator comprises a plurality of magnets disposed in generally circular laminations. The second shaft comprises a non-magnetic, electrically non-conductive body and a plurality of pole pieces disposed circumferentially therearound. The first shaft comprises magnets disposed around its exterior circumference and shaped to fit rotatably within the second shaft.

20 Claims, 14 Drawing Sheets

MAGNETIC GEAR FOR USE WITH WELLBORE INSTRUMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of magnetic gears to provide a torque transmission connection between a source of rotational energy and an instrument disposed in a wellbore that requires rotational energy at a different speed and torque than provided by the source.

U.S. Pat. No. 7,549,467 issued to McDonald et al. describes a wellbore rotational instrument system disposed in a wellbore. Rotational energy is supplied by power from a source external to the wellbore or within the wellbore. The system includes a magnetic gear member rotationally coupled at an input thereof to an output of the rotational energy source, and a rotational load, such as a pump coupled at its input to an output of the magnetic gear member. For certain wellbore instruments, such as electrically submersible pumps (ESPs) it is sometimes desirable to use a high speed, low torque electric motor in the wellbore and a low-speed, high torque pump, such as a progressive cavity pump. Other configurations may require the reverse arrangement of speed and torque of the rotating load with respect to those of the rotational energy source. Configuring a magnetic gear member for such applications as proven challenging. It is desirable to have a reliable magnetic gear for use with certain types of wellbore instruments.

SUMMARY

A wellbore rotating instrument system according to one aspect includes a source of rotational energy for transmission thereof to within a wellbore. At least one magnetic gear assembly is coupled at its input to an output of the source. A rotating load is coupled at its input to a rotational output of the magnetic gear assembly. The at least one magnetic gear assembly comprises a housing, a stator disposed in the housing proximate an inner wall thereof, a second shaft rotatably supported on bearings disposed at longitudinally spaced apart locations inside the housing and a first shaft rotatably supported inside the output shaft. The stator comprises a plurality of magnets disposed in generally circular laminations. The second shaft comprises a non-magnetic, electrically non-conductive body and a plurality of pole pieces disposed circumferentially therearound. The first shaft comprises magnets disposed around its exterior circumference and shaped to fit rotatably within the second shaft.

Other aspects and advantages will be apparent from the description and claims which follow.

DETAILED DESCRIPTION

Figure 1:
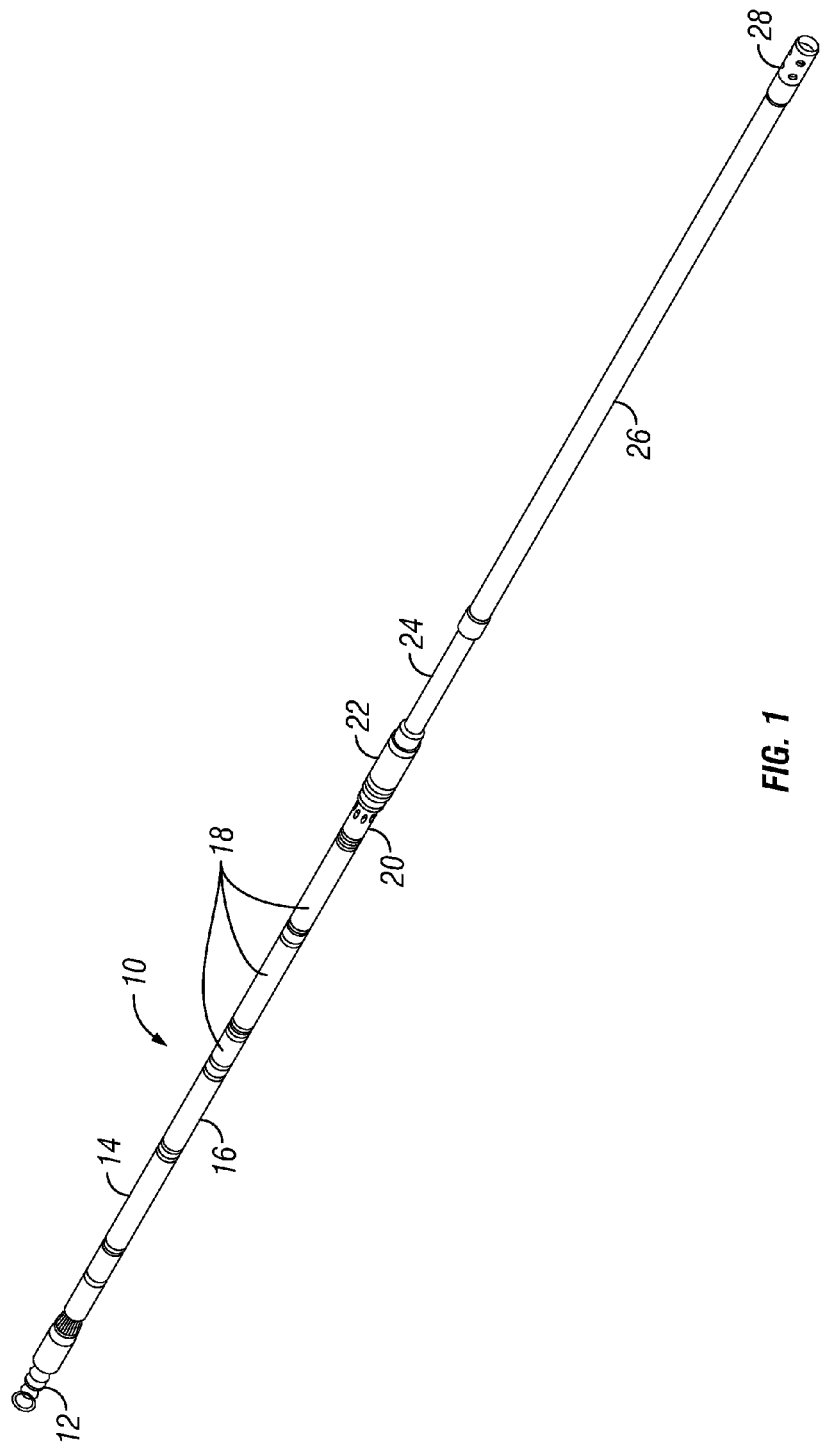
FIG. 1 is an overview of an example rotating wellbore instrument system.

FIG. 1 shows an example of a wellbore rotating instrument system according to various aspects hereof will be described with reference to an electrical submersible pump (ESP) system. It should be clearly understood that the present disclosure encompasses any application for a wellbore rotating instrument system using a magnetic gear assembly to convert speed and torque from a source or rotational energy, whether disposed in the wellbore or externally thereto, into a different speed and torque to operate a rotating load instrument. Accordingly, the disclosure is not limited in scope to the example ESP system described herein as a non-limiting example.

An example ESP system 10 that may be conveyed into a well using jointed tubing, wireline, slickline or coiled tubing, for example is shown generally. The ESP system 10 may include an upper or "top" sub 12 that is configured to make connection to an end of one of the foregoing conveyance devices into the wellbore. A lower end of the ESP system may include a "muleshoe" sub 28. The muleshoe sub 28 is added downhole of the pump to provide protection while running into hole during deployment, and to provide a mounting location for a pump intake memory gauge. In addition, it may provide a suitable location for inner bore sealing as part of a well barrier control mechanism. Both a single-shot sealing option, and a pressure responsive valve with multiple stable positions may be considered as suitable example options for wellbore sealing below the muleshoe sub 28.

The top sub 12 may be followed successively by a "star point sub" and a source of rotational energy for transmission into the wellbore, e.g., an electric motor 14. It should be noted that other forms of rotational energy may be disposed outside the wellbore, for example rod strings, and transmit rotational energy from a source to within the wellbore.

The star point sub 12 may include one or more sensors and control devices related to operation of the ESP system 10 and the motor 14. The motor 14 may be coupled at its lower end to a magnetic gear assembly 16. In the present example, the magnetic gear assembly 16 accepts as rotational input from the motor 14 high rotational speed and low torque, and converts such rotation therein into low rotational speed at correspondingly (inversely) proportional high torque. In other examples, the torque/speed relationship between the magnetic gear assembly input and output may be reversed.

A protector 18 may be similar in operating principle to the protector ordinarily used in ESP systems and may be configured to exclude fluid at existing wellbore pressure and temperature from entering the magnetic gear 16 and the motor 14. The protector 18 may also axially decouple the magnetic gear assembly 16 and the motor from axial and lateral loading generated by a pump, explained below.

The present example of ESP system 10 may be of modular design, and enable first lowering the pump 26, (which in the present example forms the rotational load instrument; other rotating loads may be functionally connected to the output of the magnetic gear assembly in other examples) including the muleshoe sub 28, the pump 26, which may be a progressive cavity pump, a flex sub 27 to enable relative axial deflection between the upper components (terminating at field coupling sub coupled to the upper end of a pump discharge sub 20, and thence coupled to a lower end of the protector 18 and the components described above. The pump 26, flex sub 27, pump discharge sub 20 and field coupling sub 22 may be inserted into the well first, to be followed by the foregoing described components beginning with the field coupling sub 22. The entire ESP system 10 may also be lowered into the wellbore as an assembled unit.

In some examples, a shroud (not shown) may seal an annular space between the pump system and the interior of the wellbore axially between the pump inlet and the pump outlet so that flow from the pump 26 is constrained to move up the wellbore.

Figure 2A:
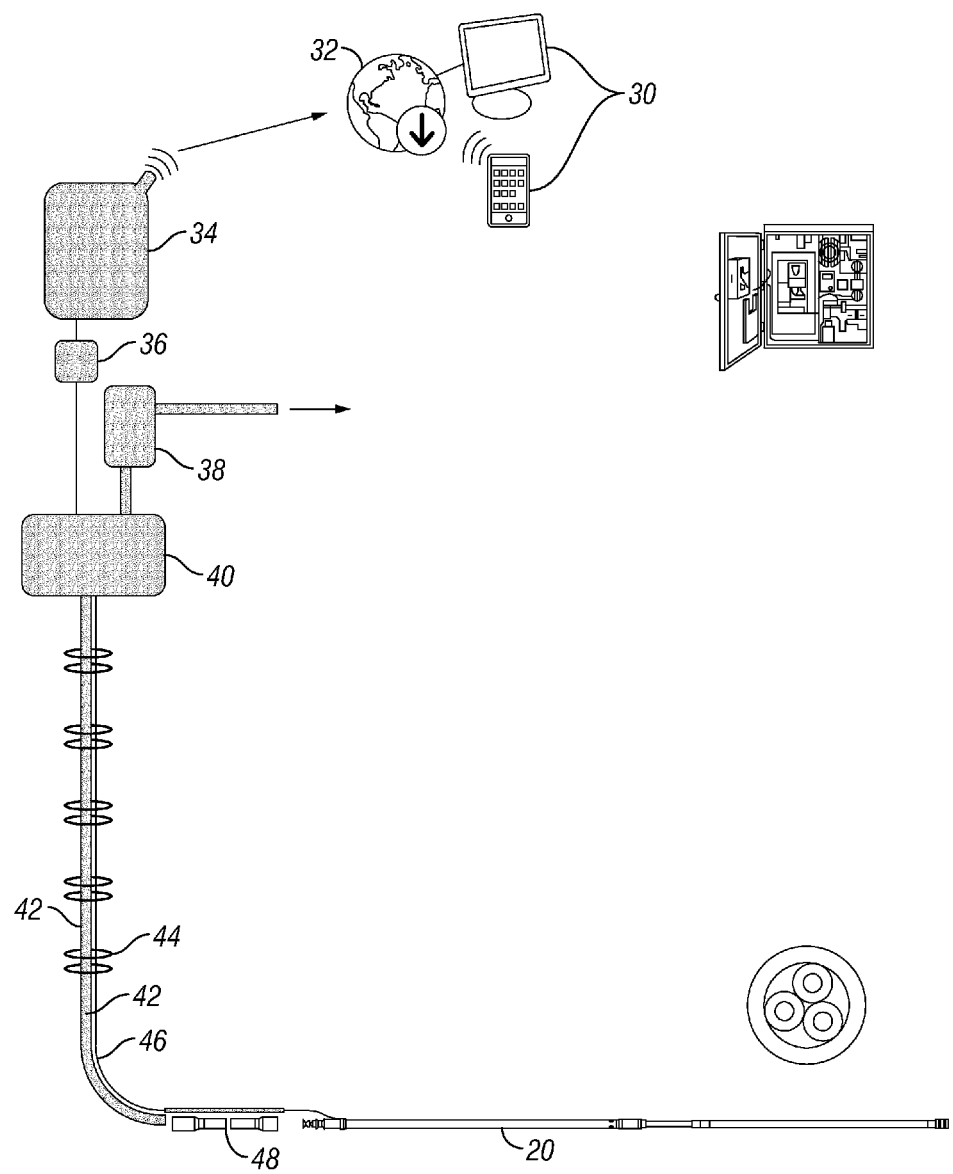
FIG. 2A shows an example implementation of the ESP system of FIG. 1 wherein data transmission from the ESP system and control thereof may be remotely performed over a network, such as the Internet.
Figure 2B:
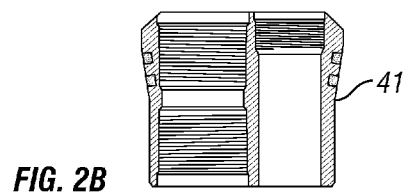
FIG. 2B shows an example combination tubing and cable hanger.

FIG. 2A shows the example ESP system 10 of FIG. 1 as it may be deployed in an example wellbore. The ESP system assembly 10 may be deployed at the end of threaded, jointed tubing 42, extending from the system assembly 10 to a wellhead 40. Selective length adjustments of the jointed tubing to ensure proper axial positioning of the ESP system 10 may be made using one or more selected short length "pup" joints 48 of threaded tubing. Electrical and/or optical signal cable 46 may extend from the star point sub (FIG. 1) along the exterior of the jointed tubing 42, retained thereon by bands 44 up to a dual orifice hanger disposed in the wellhead 40. An example of such a hanger is shown in cross section at 41 in FIG. 2B. Tubing and fluid flow exit from the wellhead 40 may extend to a flow tee 38 and to fluid processing devices (not shown) proximate the surface. Electrical connections from the wellhead 40 may extend to a junction box 36 wherein a power supply (not shown) may be provided to supply electrical power to operate the motor (14 in FIG. 1) and to strip off sensor signals from the cable 46 and conduct them to a signal communication subsystem 34 so that data signals from the ESP assembly 10 and control signals communicated thereto may be transferred to and from a remote control station 30 such as may communicate over a secure network such as a secure server 32 connected to the Internet.

Figure 2C:
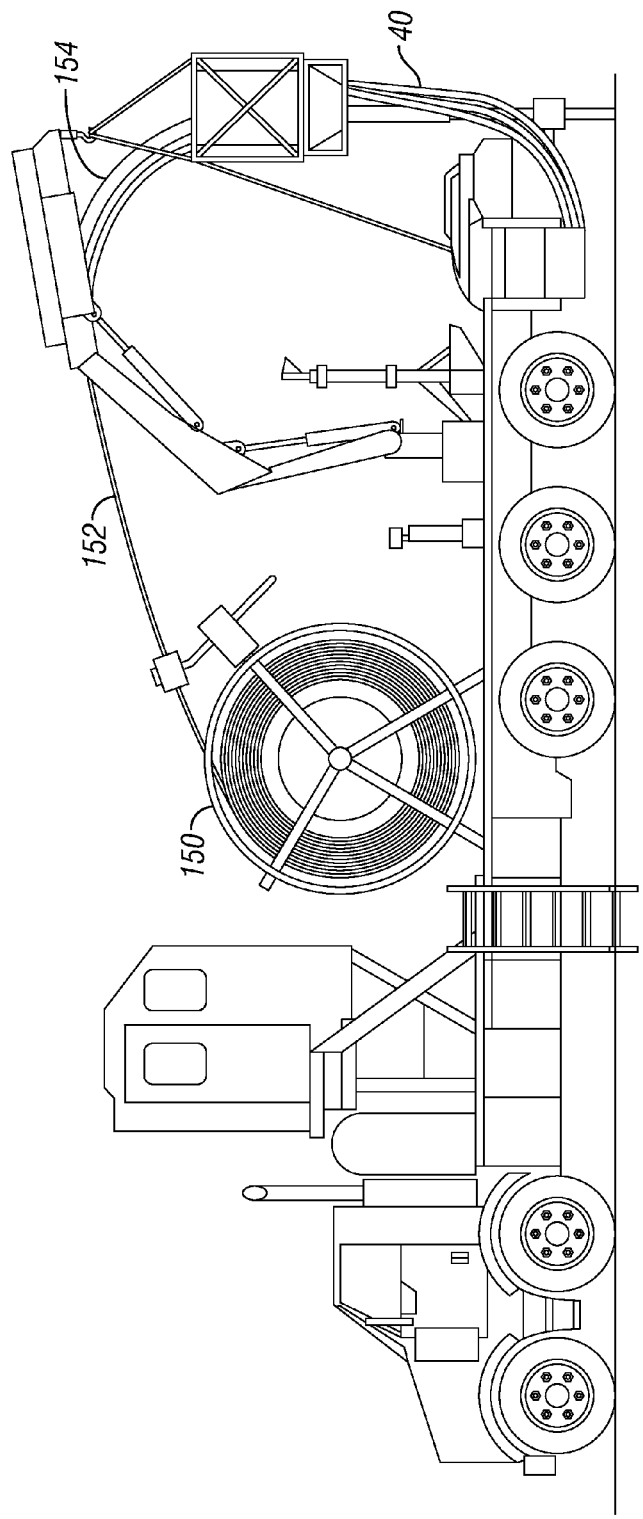
FIG. 2C shows an example coiled tubing unit.

In other examples, the pump system 10 may be inserted into and removed from the wellbore using a coiled tubing unit. An example of the foregoing is shown in FIG. 2C and may include a storage reel 150, a coiled tubing 152 thereon, a roller assembly 154 and a tubing injector 156 coupled to the wellhead 40. The cable (46 in FIG. 2B) may be disposed inside the coiled tubing 154 in the present example.

Figure 3:
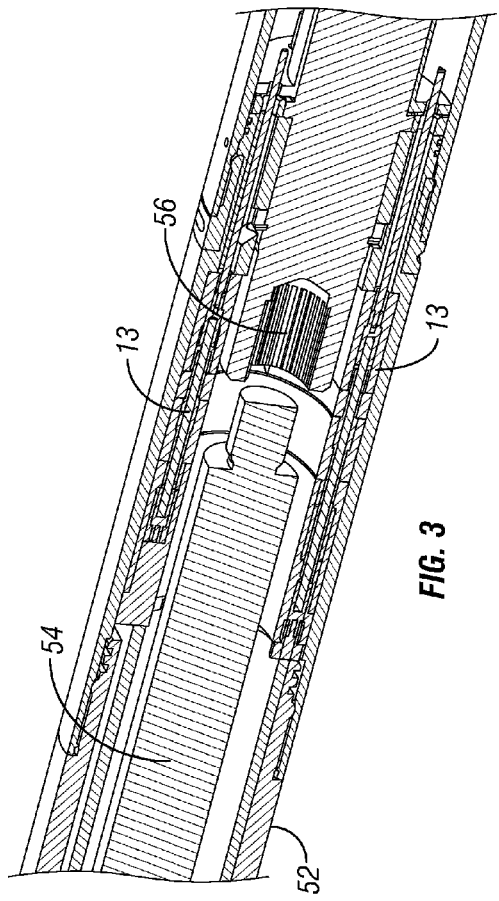
FIG. 3 shows an example upper portion of the ESP system of FIG. 1.
Figure 4:
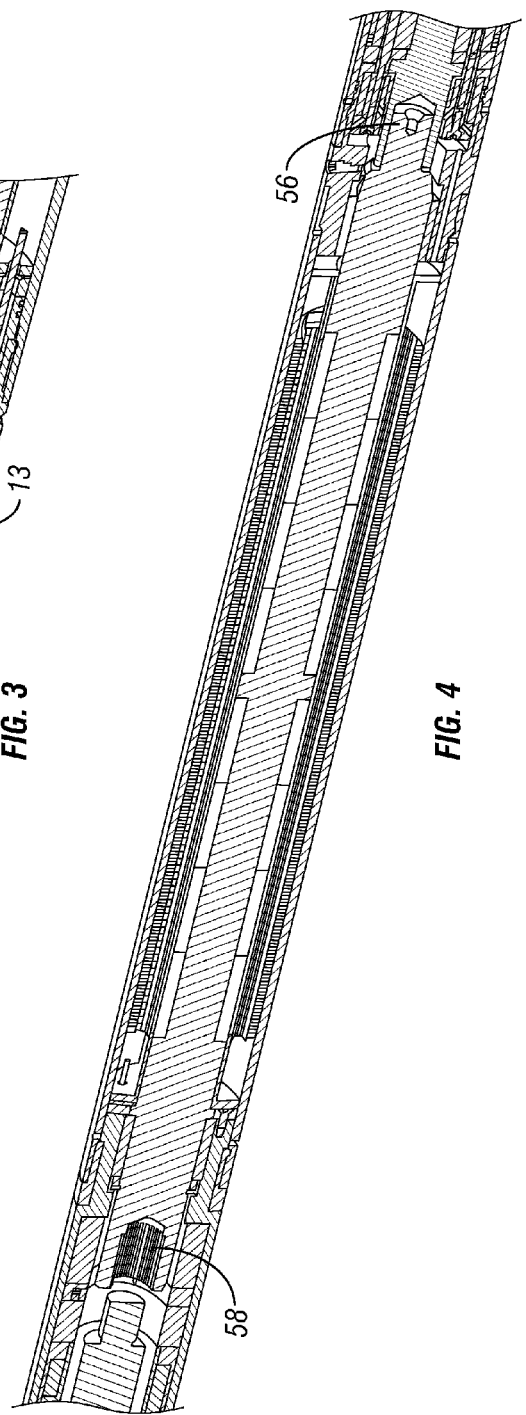
FIG. 4 shows an example electric motor of the example ESP system.

FIG. 3 shows an example connection between the star point sub and the motor. The star point sub may include various forms of sensors 54, for example pressure, temperature and flow sensors. The star point sub may include electrical feedthroughs 13 to enable external electrical connection to the cable (46 in FIG. 2A) to be transposed to internal electrical connections between the various "subs" or components of the ESP system. In FIG. 3 connection 56 to the motor (14 in FIG. 1 is shown) wherein the feedthroughs 13 are visible. In some examples, the feedthroughs 13 may not extend past the motor. FIG. 3 also shows an example connection between the star point sub (14 in FIG. 1) and the top sub (12 in FIG. 1). FIG. 4 shows an example connection 56 between the motor 14 and the magnetic gear (16 in FIG. 1). The motor may be rotationally connected by splines or other connection to an input shaft of the magnetic gear (16 in FIG. 1).

Figure 5:
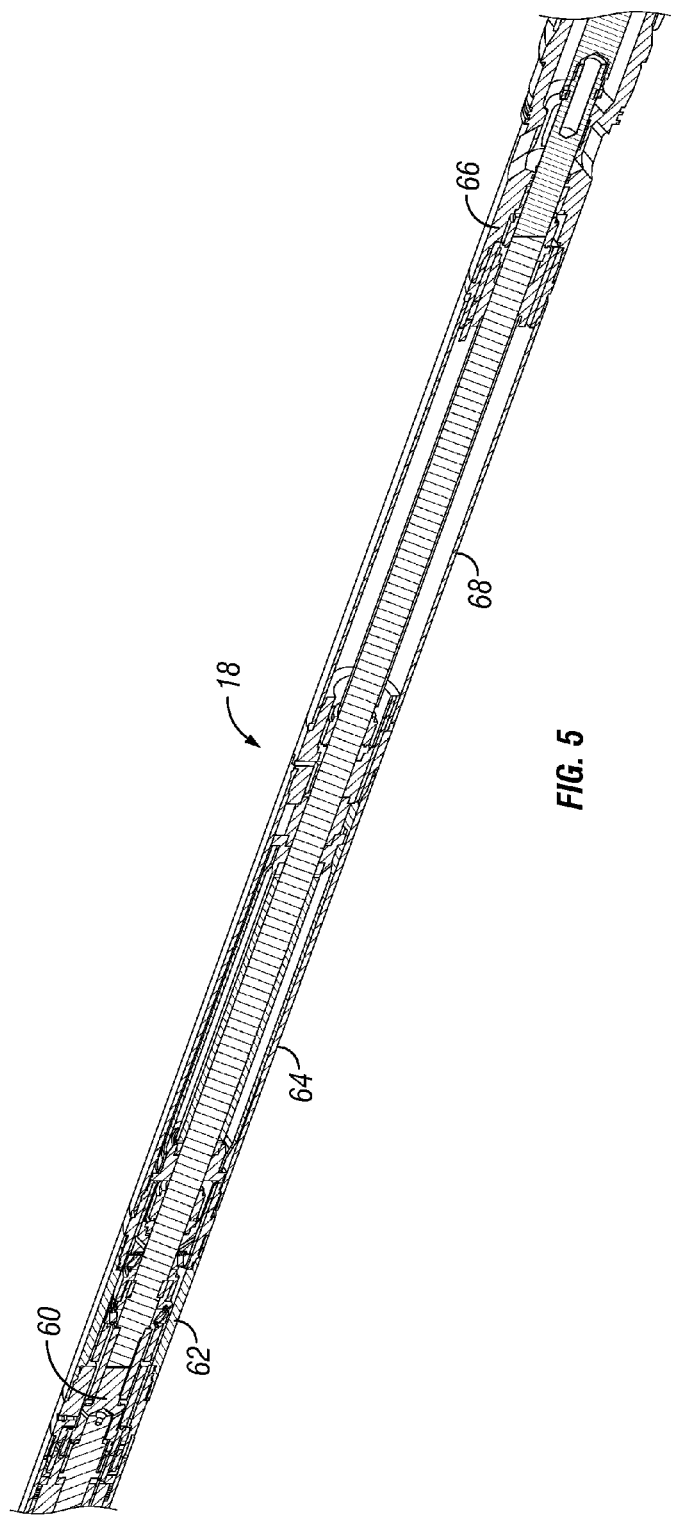
FIG. 5 shows an example connection between a magnetic gear and a flow section including pressure compensation.

FIG. 5 shows connection between the lower end of the magnetic gear and an upper portion of the protector 18. The protector 18 may consist of a thrust section, a pressure compensation section and a flow section, shown in FIG. 5 at 62, 64, and 68, respectively.

Figure 6:
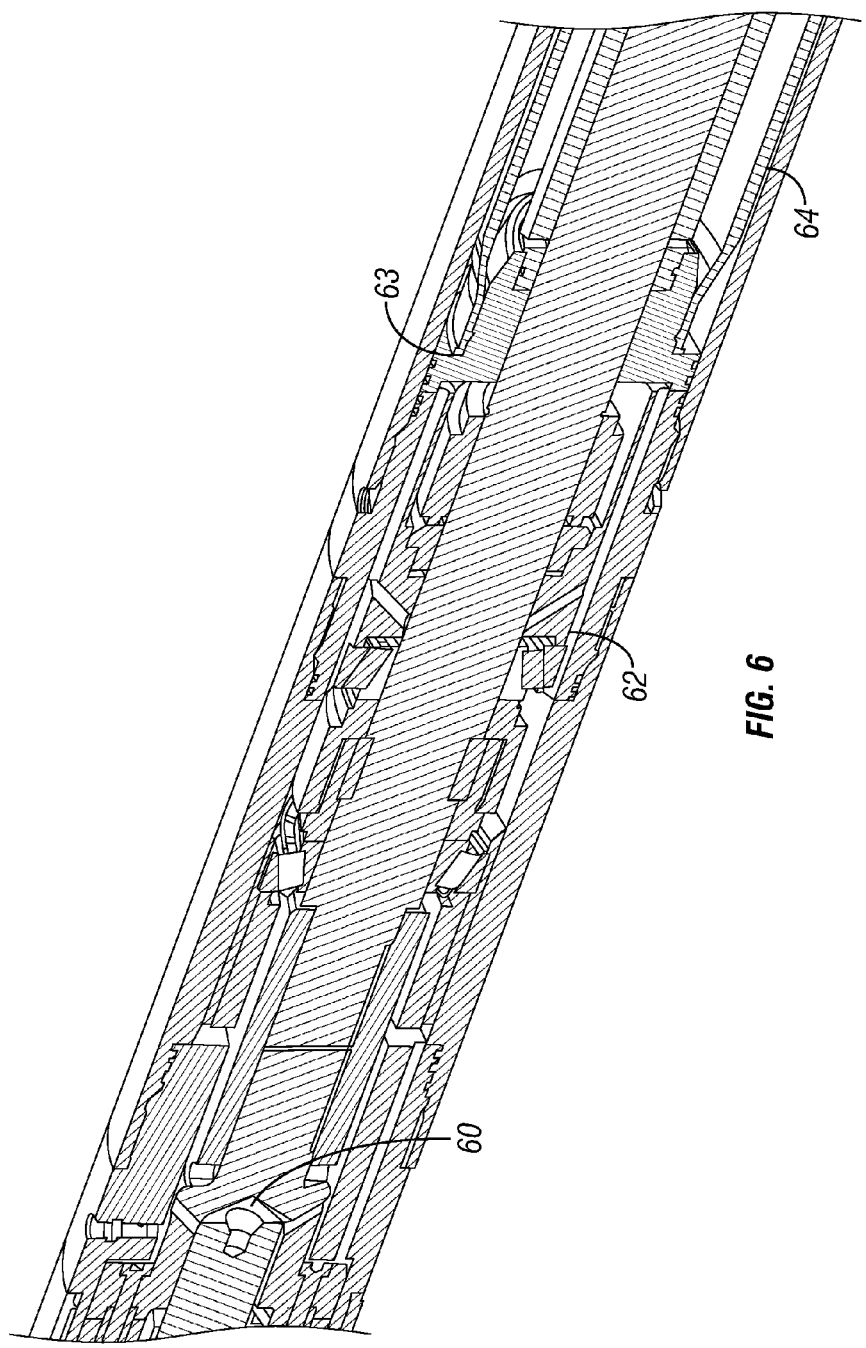
FIG. 6 shows the example connection in more detail.

The thrust section 62 is shown in more detailed view in FIG. 6. Generally, the thrust section 62 includes bearings to isolate thrust loading from the magnetic gear assembly (16 in FIG. 1), while freely transmitting rotation therethrough. The pressure compensation section 63 may include a flexible bladder or reservoir 64 to maintain pressure of hydraulic or other oil filling the interior of the protector 18 at ambient wellbore pressure so that no wellbore fluid will enter the interior of such components. The components located above the protector 18 may include provision for communication of hydraulic pressure from the bladder or reservoir 64 to the interior of such components so that wellbore fluid will be less likely to enter any or all of them by reason of differential fluid pressure.

Figure 7:
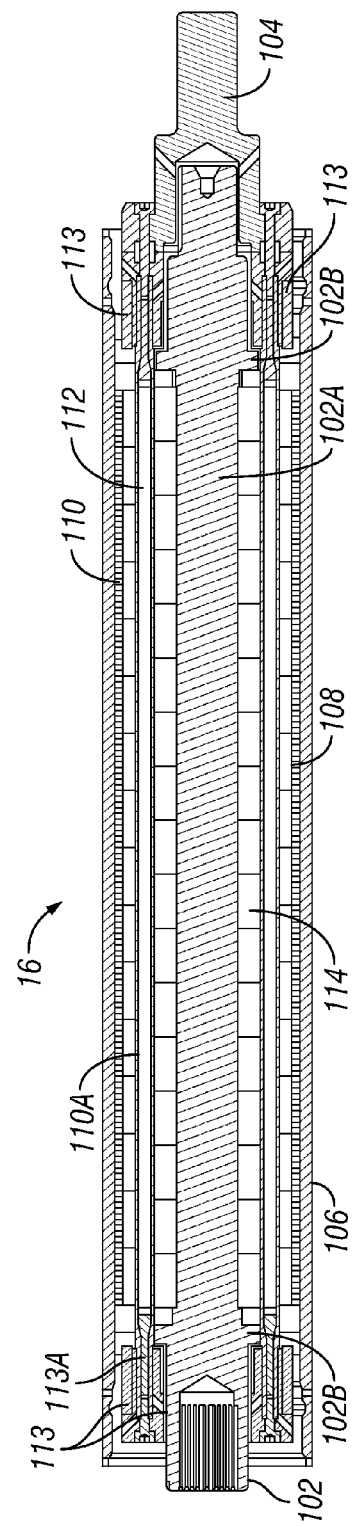
FIG. 7 shows a cross section of an example magnetic gear.

FIG. 7 shows a cross section of an example magnetic gear assembly 16. The magnetic gear assembly may by contained in a pressure resistant housing 106 made from steel or other suitable material. An input shaft 102A, made from steel or other suitable material may have a splined input end 102 to accept rotational power from the source of rotational energy, which may be the motor (FIG. 1) in the present example, another, similarly configured magnetic gear assembly located longitudinally above, or may be, for example a rod string rotated from outside the wellbore to transmit rotation from a source outside the wellbore to the input of the magnetic gear assembly 16. The input shaft 102A may be rotatably supported by bearings 113 within the housing 106. The bearings 113 may be located at suitable axial positions along the housing 106 and may be retained therein by interference fit, locking rings or any other suitable means. The bearings 113 may be journal bearings and may be lubricated by the hydraulic oil filling the interior of the housing (as pressure compensated by the reservoir in the protector). As will be explained below, the present example magnetic gear assembly 16 may be used in other systems with the longitudinal ends reversed. Thus what is presently defined as the input shaft 102A would in such cases be the output shaft. For purposes of defining the scope of this disclosure, what in the present example is termed "input shaft" may be referred to as a "first shaft."

An output shaft 112 may be rotatably supported in the same bearings 113, radially between the input shaft 102A and the interior wall of the housing 106. The output shaft 112 may be formed generally as an annular cylinder and thus may be rotatably supported coaxially with the input shaft 102A in the bearings 113. Each longitudinal end of the output shaft 112 may be swaged for proper fit in the bearings 113 and to provide a connection between steel or other metallic components supported in the bearings 113 and a composite material from which the output shaft 112 may be formed. The foregoing swaging will be explained in more detail with reference to FIGS. 7A through 7C. The output shaft 112 may have a splined output coupling 104 at one longitudinal end to transfer torque to a further component of the ESP system, e.g., a shaft in the protector (FIG. 1), to another magnetic gear assembly, or to any other rotating load instrument. As will be explained below, the present example magnetic gear assembly 16 may be used in other systems with the longitudinal ends reversed. Thus what is presently defined as the output shaft 112 would in such cases be the input shaft. For purposes of defining the scope of this disclosure, what in the present example is termed "output shaft" may be referred to as a "second shaft."

Figure 8:
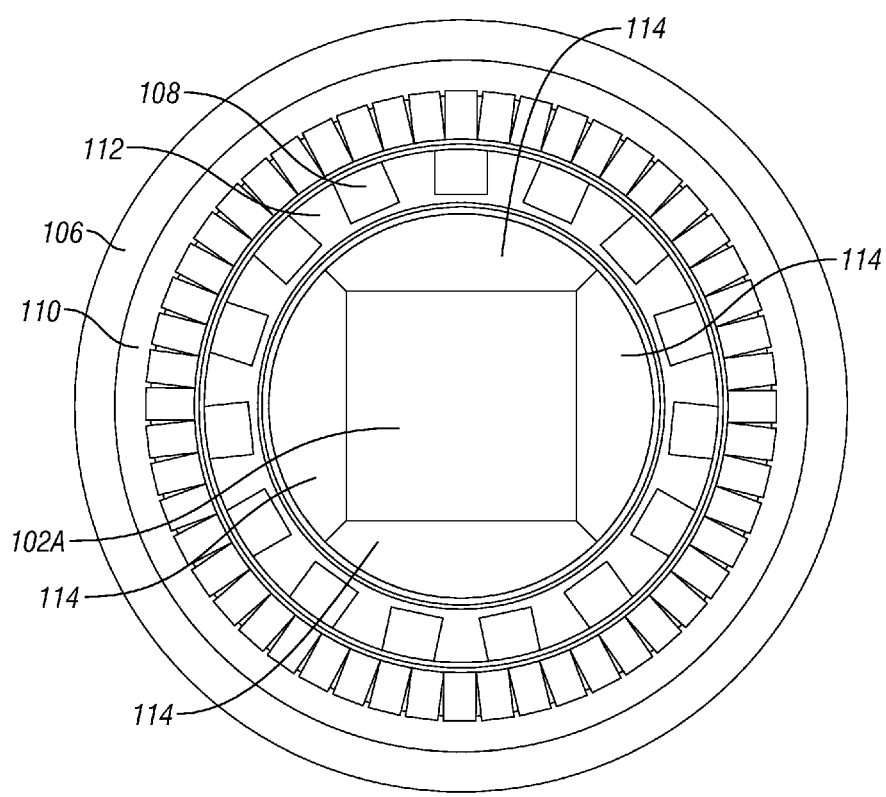
FIG. 8 shows an end view of the example magnetic gear in FIG. 7.

The input shaft 102A may include a flange 102B proximate each longitudinal end. The flanges 102B serve to axially retain a plurality of magnets 114 (input shaft magnets), which may be permanent magnets, on the input shaft 102A. Referring briefly to FIG. 8, the input shaft magnets 114 may be oriented in quadrature as shown provided that quadrature magnet material is used (e.g., samarium cobalt). The cross section of the input shaft 102A within the limits of the flanges (102B in FIG. 7) may be as shown in FIG. 8, or any other configuration that enables transmission of torque from the input shaft to the input shaft magnets 114. The input shaft magnets 114 may have a generally cylindrically shaped exterior surface as shown to enable rotation within the interior of the output shaft (112 in FIG. 7). Returning to FIG. 7, the input shaft magnets 114 may be arranged as a plurality of longitudinal magnet segments as shown. The input shaft magnets 114 may be, for example, bonded to the input shaft 102A using suitable adhesive. The input shaft 102A, if made from a ferromagnetic or magnetically permeable material (e.g., magnetically permeable steel), may form a flux closure for the input shaft magnets 114.

Figure 7A:
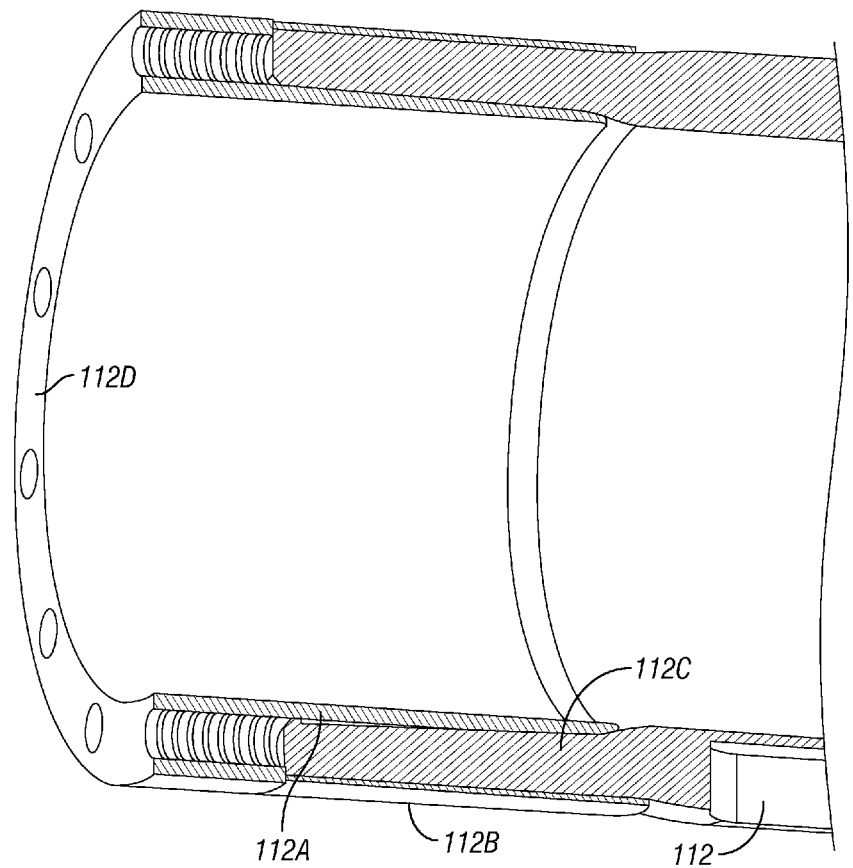
FIG. 7A shows a drive end of the output shaft with a swaged drive coupling.

Details of the output shaft and its assembly to the other components of the magnetic gear assembly may be better understood with reference to FIGS. 7A through 7E. FIG. 7A shows a drive end of the output shaft 112 may include an extension 112C of the composite material beyond the main body of the composite material. A metal (e.g., steel) sleeve 112B may be slipped over the extension 112C. A drive insert 112A having a tapered internal sleeve may be press-fit, bonded and welded into the extension 112C. The taper causes radial expansion of the sleeve 112B and thus tight interference fit of the drive insert 112A into the extension 112C, while reducing susceptibility of the extension to failure under loading. The drive insert 112A may be configured for attachment using bolts through tapped holes in a flange 112D as shown, or may be formed with spines or other torque transmission feature (none shown).

Figure 7B:
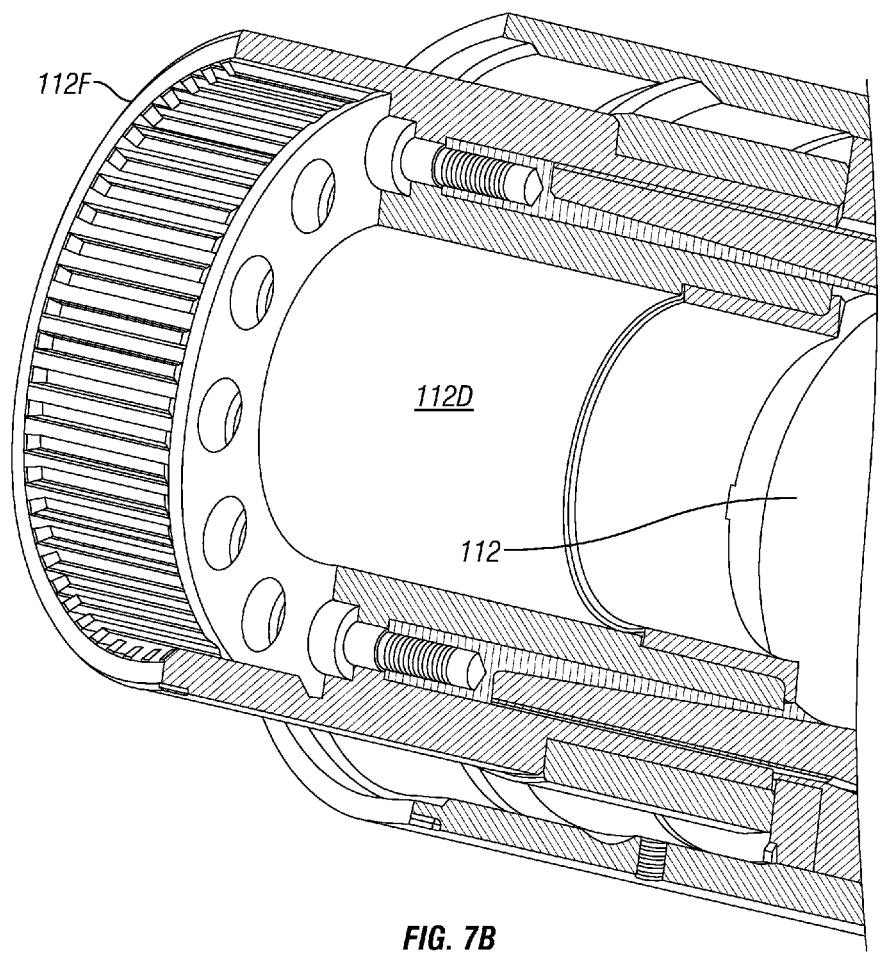
FIG. 7B shows an example female spline drive.
Figure 7C:
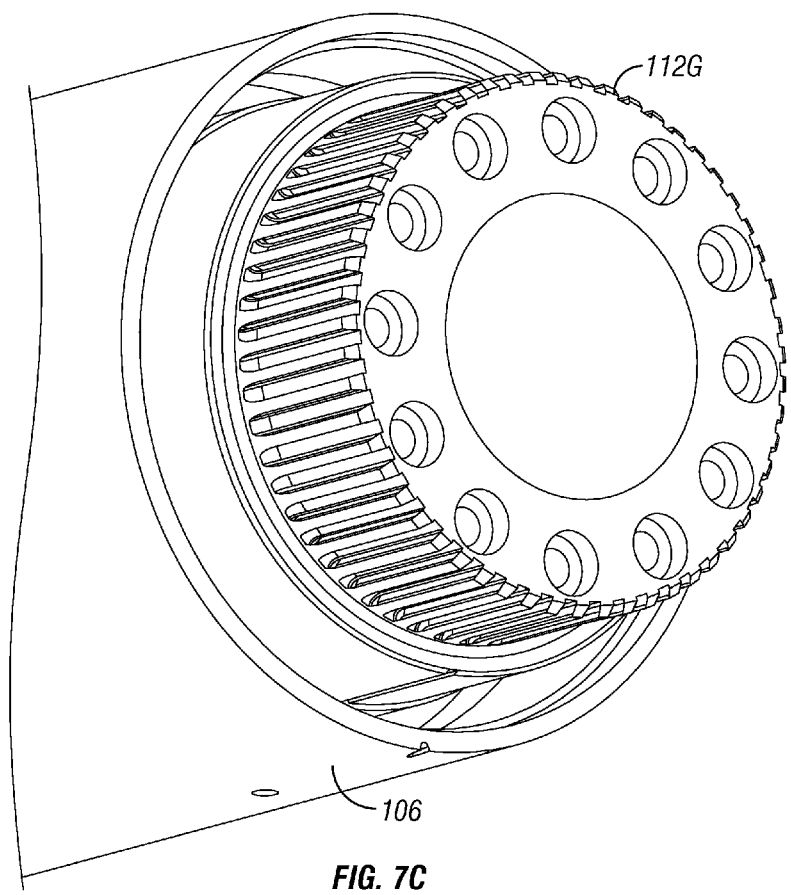
FIG. 7C shows an example male spline drive.

FIG. 7B shows an example female spline drive 112F bolted to the flange 112D described with reference to FIG. 7. FIG. 7C shows a male spline drive 112G bolted to the drive flange 112D described with reference to FIG. 7A. The purpose for including the spline drive features 112F, 112G on the longitudinal ends of the output shaft 112 is to enable longitudinal coupling together of a plurality of similar magnetic gear assemblies if additional torque capacity is required.

Figure 7D:
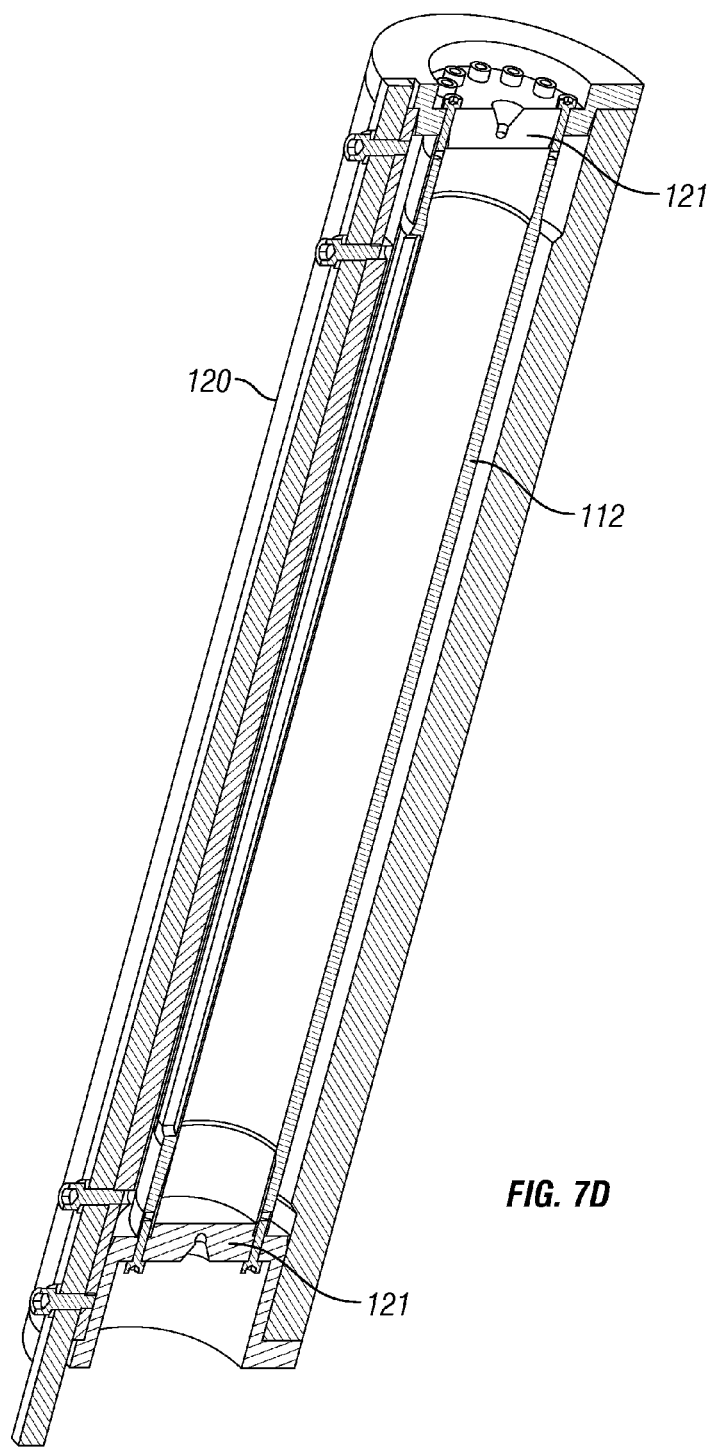
FIG. 7D shows an example assembly fixture to affix the drive couplings to the output shaft.

FIG. 7D shows an example fixture used to press the tapered drive insert (112A in FIG. 7A) into the ends of the drive extensions (112C in FIG. 7A). Using such a fixture may help ensure concentricity in the assembly of the drive sleeves into the extensions. The fixture may include a cylinder 120 to concentrically hold the output shaft 112, and an end plate 121 bolted at each longitudinal end to each drive insert (112A in FIG. 7A). As the end plates 121 are compressed longitudinally into the cylinder 120, the drive inserts 112A will be pressed into the extensions (112C in FIG. 7A) to form a concentric assembly.

Figure 7E:
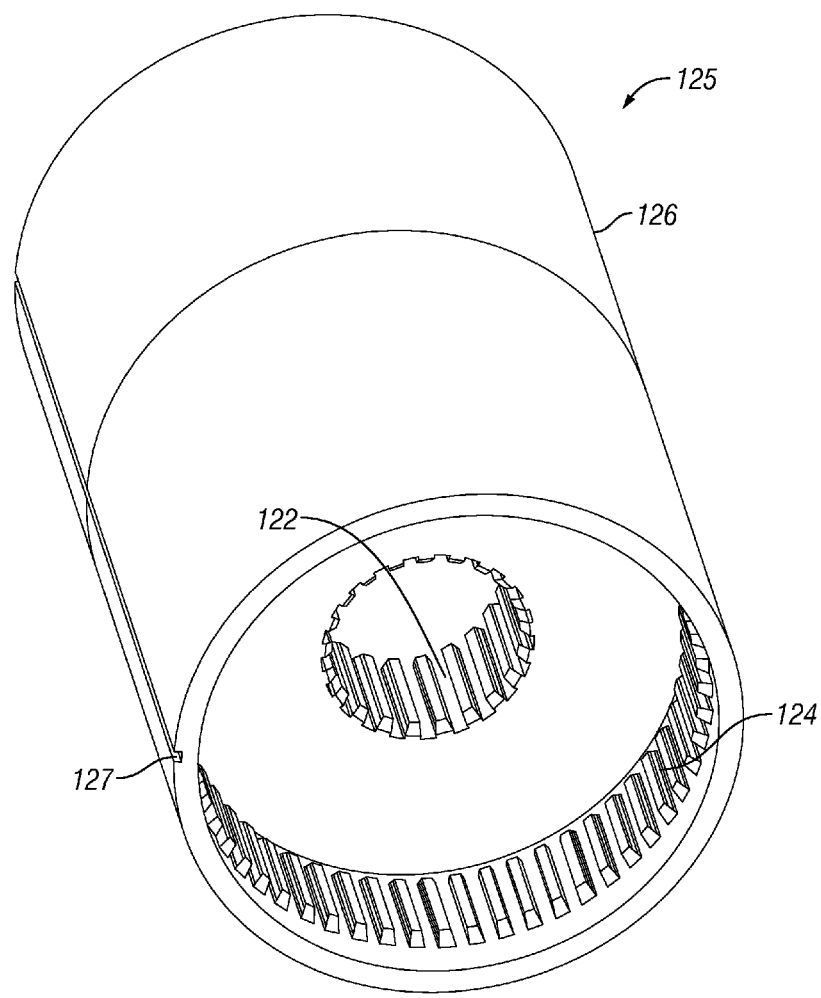
FIG. 7E shows an example input shaft/output shaft alignment fixture.

FIG. 7E shows a tool that could be used during assembly that would be used to hold the output shaft and the input shaft together in relative radial alignment, that is, concentrically, thus resisting magnetic cogging forces. The tool 125 may include a cylinder 126 that fits within stator magnets (explained with reference to FIGS. 8-11). A spline coupling may be provided for each of the output shaft and the input shaft. 124 and 122, respectively There may also be a clocking notch 127 that runs along the exterior of the cylinder 126 to ensure that during assembly, the cylinder and the shafts are aligned as they are brought together, i.e., there is rotational synchronization between two stators, two input shafts and two output shafts. Such tool may be used to assemble a plurality of longitudinally connected magnetic gear units.

Returning to FIG. 7, A plurality of magnets 111, which may be permanent magnets may be fixedly mounted in the form of an annular cylinder, radially outside the output shaft 112 and inside retaining laminations 110 disposed proximate the interior wall of the housing 106. The assembly of the foregoing magnets 111 and laminations 110 may be referred to as the "stator", and the magnets 111 may be referred to as stator magnets. As with the input shaft magnets 114, the stator magnets 111 may be formed in axial segments. The stator magnets 111 may also be formed from a quadrature magnet material and arranged as will be further explained with reference to FIG. 11. The stator magnets 111 may be retained in the laminations 110 and protected from damage by including a thin, non-magnetic sleeve 110A fitted to the interior of the stator magnets 111.

Referring again to FIG. 8, the respective radial positions of the housing 106, laminations 110, stator magnets 111, output shaft 112, input shaft magnets 114 and input shaft 102A may be observed. In one example, the output shaft 112 may be made from a non-magnetic composite material, e.g., fiber reinforced plastic or other suitably strong, non-magnetic, preferably electrically non-conductive material. Arranged circumferentially about the output shaft 112, in the present example proximate the exterior circumference thereof, are pole pieces 108. The pole pieces 108 may be made from high magnetic permeability material such as ferrite. While shown in generally square cross-section, the pole pieces 108 may be machined on their exterior surfaces to conform to the generally cylindrical exterior shape of the output shaft 112.

Referring briefly once again to FIG. 7, the pole pieces 108 may be formed as a plurality of axial segments.

Figure 9:
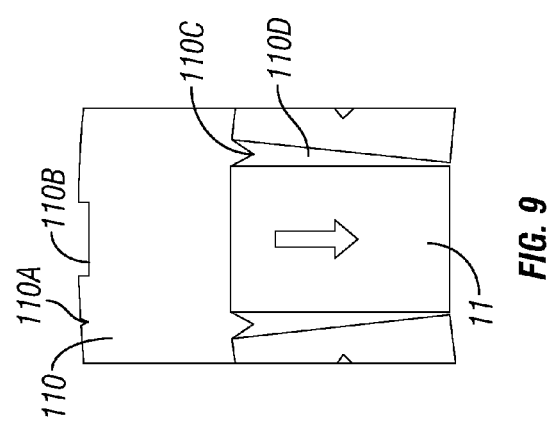
FIG. 9 shows a detailed view of mounting magnets to a laminated flux closure.

Referring to FIG. 9, a plurality of longitudinally stacked laminations 110 may form mounting and flux closures for the stator magnets 111. One of the laminations 110 is shown in detail and may include alignment pins 110C for each stator magnet 110, wherein the stator magnets 111 may be bonded to the laminations 110 using adhesive 110D. An exterior radial surface of the laminations 110 may include features such as an alignment groove 110A and a weld groove 110B to enable assembly to the housing (106 in FIG. 7) so that proper axial and rotational alignment of the stator magnets 111 is maintained. To provide flux closure for the stator magnets the laminations 110 may be made from steel or magnetically permeable iron.

Figure 10:
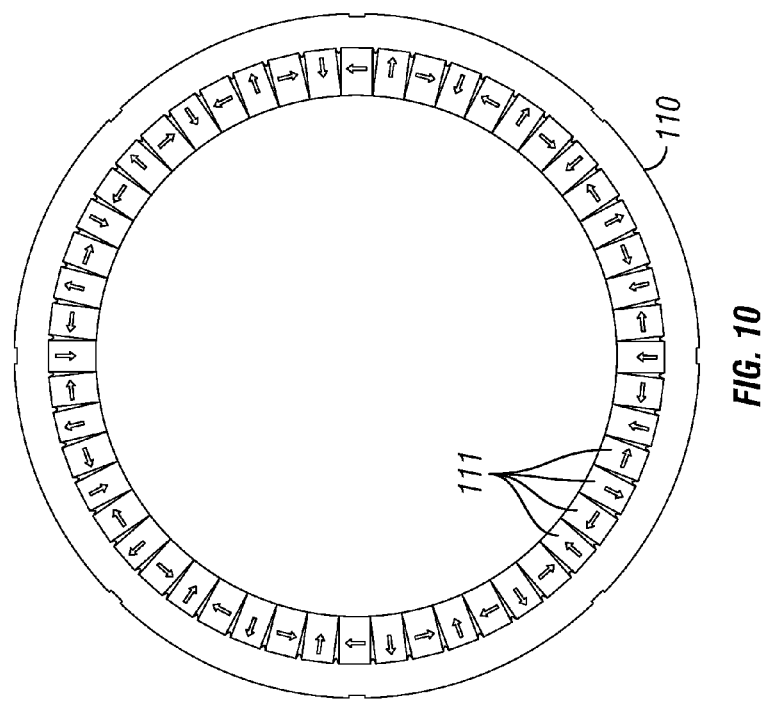
FIG. 10 shows an example magnet assembly and laminated flux closure in cross section.

During assembly, and with reference to FIG. 10, a number of laminations 110 may be stacked one on top of the other until an axial dimension of the segments of the stator magnets 111 is equaled. The segments of the stator magnets 111 may then be bonded to the laminations 110 as shown to form a plurality of sub-assemblies as in FIG. 10. A plurality of sub assemblies may then be assembled longitudinally to the length selected for the stator. In one example, the laminations 111 may be interference fit within the housing (106 in FIG. 7). An example technique for interference fit assembly may be to heat the housing (106 in FIG. 7) to enable free entry of the plurality of sub assemblies, then allowing the housing (106 in FIG. 7) to cool, thus locking the laminations in place. In some examples, the material from which the housing is selected may have a coefficient of thermal expansion selected so that heating the housing to enable insertion of the laminations will not exceed the curie temperature of the stator magnets 111.

Figure 11:
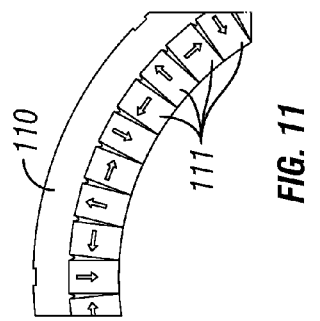
FIG. 11 shows a detailed view of a circumferential portion of the magnet and flux closure assembly to illustrate a possible orientation of the magnets.

FIG. 11 shows an enlarged view of a circumferential segment of some of the laminations 1110 and stator magnets 111 to illustrate the relative orientations of the magnet poles. In the present example, the stator magnets 111 may be successively oriented in quadrature.

In other examples, the longitudinal orientation of the magnetic gear assembly as described with reference to FIGS. 7 through 11 may be inverted with respect to the described rotational energy source. Thus, what in FIGS. 7 through 11 is described the input shaft becomes the output shaft, and correspondingly what in FIGS. 7 through 11 is described as the output shaft becomes the input shaft. The internal features of the magnetic gear assembly in such example may be otherwise as described with reference to FIGS. 7 through 11.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore rotating instrument system, comprising:
a source of rotational energy communicable at a rotary output of the source to a selected axial position within a wellbore;
at least one magnetic gear assembly disposed in the wellbore and coupled at a rotary input of the source to an output of the source;
a rotating load instrument disposed in the wellbore and functionally coupled at a rotary input of the rotating load instrument to a rotational output of the magnetic gear assembly;
wherein the at least one magnetic gear assembly comprises a housing, a stator disposed in the housing proximate an inner wall thereof, a second shaft rotatably supported on bearings disposed at longitudinally spaced apart locations inside the housing and a first shaft rotatably supported inside the second shaft; and
wherein the stator comprises a plurality of magnets disposed in a plurality of generally circular laminations, wherein the second shaft comprises a non-magnetic, electrically non-conductive body and a plurality of pole pieces disposed circumferentially around an exterior circumference of the body, and wherein the first shaft comprises a plurality of magnets disposed around an exterior circumference thereof and shaped to fit rotatably within an interior of the second shaft, wherein the body of the second shaft comprises a composite material and wherein the body of the second shaft comprises a shaft extension at each longitudinal end, a metal ring fit over each extension, and a tapered coupling press fitted, bonded and welded into an interior of each extension.

2. The instrument system of claim 1 wherein the first shaft comprises an input to the at least one magnetic gear assembly and the second shaft comprises an output thereof.

3. The instrument system of claim 1 wherein the second shaft comprises an input to the at least one magnetic gear assembly and the first shaft comprises an output thereof.

4. The instrument system of claim 1 wherein the first shaft comprises a splined connection at at least one longitudinal end.

5. The instrument system of claim 1 wherein the second shaft comprises a splined connection at least one longitudinal end.

6. The instrument system of claim 1 wherein a number of the stator magnets, a number of the pole pieces and a number of the first shaft magnets are selected to cause a predetermined difference between a speed of the input and a speed of the output and an inverse amount of torque applied to the input and exerted by the output.

7. The instrument system of claim 1 wherein the stator magnets, the pole pieces and the first shaft magnets are formed from longitudinal segments.

8. The instrument system of claim 1 wherein each tapered coupling comprises a flange having circumferentially spaced apart bolt holes thereon.

9. The instrument system of claim 8 further comprising at least one of a female spline and a male spline bolted to at least one of the flanges.

10. The instrument system of claim 1 wherein the laminations are an interference fit within the interior of the housing.

11. The instrument system of claim 1 wherein the laminations comprise receptacles correspondingly shaped to receive the stator magnets.

12. The instrument system of claim 1 wherein the first shaft and the second shaft are rotatably supported at substantially axially collocated journal bearings.

13. The instrument system of claim 1 further comprising an assembly tool for inserting the first shaft into the second shaft, the assembly tool comprising splines for engaging a splined connection on the longitudinal end of both the first shaft and the second shaft to maintain radial alignment of the first shaft and the second shaft with relation to the stator.

14. The instrument system of claim 1 wherein the rotating load instrument comprises a pump.

15. The instrument system of claim 1 further comprising a flexible torque transmission coupling disposed between a rotational output of the protector assembly and a rotational input of the pump.

16. The instrument system of claim 1 wherein the stator magnets and the input shaft magnets are arranged such that adjacent stator magnets are magnetically oriented in quadrature with respect to each other, and adjacent input shaft magnets are magnetically oriented in quadrature with respect to each other.

17. The instrument system of claim 16 wherein the stator magnets and the input shaft magnets comprises quadrature magnet material.

18. The instrument system of claim 1 further comprising a non-magnetic sleeve disposed on an interior surface of the stator magnets.

19. The instrument system of claim 1 wherein the source of rotational energy comprises an electric motor.

20. The instrument system of claim 1 further comprising a hanging mechanism comprising a coupling to join an electric motor to a lower end of a coiled tubing, and wherein an electrical cable coupled to the instrument system is disposed within the coiled tubing and is connected to the electric motor.

* * * * *